United States Patent [19]
Schroeder

[11] Patent Number: 5,951,427
[45] Date of Patent: Sep. 14, 1999

[54] PLANOCENTRIC HYPOCYCLOIDAL GEAR

[75] Inventor: Richard P. Schroeder, St. Louis, Mo.

[73] Assignee: Moore Gear and Manufacturing Co., Hermann, Mo.

[21] Appl. No.: 08/514,619

[22] Filed: Aug. 14, 1995

[51] Int. Cl.⁶ .................................................. F16H 1/32
[52] U.S. Cl. ............................................................ 475/178
[58] Field of Search .................................. 475/176, 177, 475/178, 180

[56] References Cited

U.S. PATENT DOCUMENTS

| | | | |
|---|---|---|---|
| 3,145,585 | 8/1964 | Brown | 475/178 |
| 3,955,445 | 5/1976 | Osterwalder | 475/176 |
| 5,123,884 | 6/1992 | Kondoh et al. | 475/178 |

OTHER PUBLICATIONS

Photographs of a scale model of a planocentric hypocycloidal gear manufactured by Ferguson Machine Company in existence at least as early as 1968.

Chironis, Nicholas P., *Gear Design and Application*, Chapter 3, "Planetary Gear Systems" by John H. Glover, McGraw–Hill Book Co., New York, New York, 1967.

Lynwander, Peter, *Gear Drive Systems Design and Application*, Marcel Decker Inc., New York, New York, 1983, pp. 6–11, 293–323.

Chironis, Nicholas P., *Mechanisms&Mechanical Devices Sourcebook*, Chapter 6 Subsection, "Planetary Gear Systems" by John H. Glover, McGraw–Hill Book Co., New York, New York, 1991, pp. 268–274.

Buckingham, *Analytical Mechanics of Gears*, Dover Publications, New York, New York, 1949 (approx.), pp. 25–29.

Walter Company catalog, Mar., 1987.

Ferguson publication BF–100, date unknown, but earlier than 1990.

Ferguson bulletin PT–67, date unknown, but earlier than 1990.

Ferguson catalog 764, date unknown, but earlier than 1990.

Norbar catalog, Jan., 1991.

Sumitomo Transmission Gear Division catalog, date unknown, but earlier than 1993.

*Primary Examiner*—Charles A. Marmor
*Assistant Examiner*—Sherry Lynn Estremsky
*Attorney, Agent, or Firm*—Grant D. Kang

[57] ABSTRACT

The invention is a planocentric hypocycloidal gear assembly which eliminates drive pin sleeves and all bearings, and provides for drive pins which drive the pinions directly and provides for an aperture in an output cover plate for direct contact with an eccentric input shaft designed for inputs of between one-third and five horsepower.

7 Claims, 8 Drawing Sheets

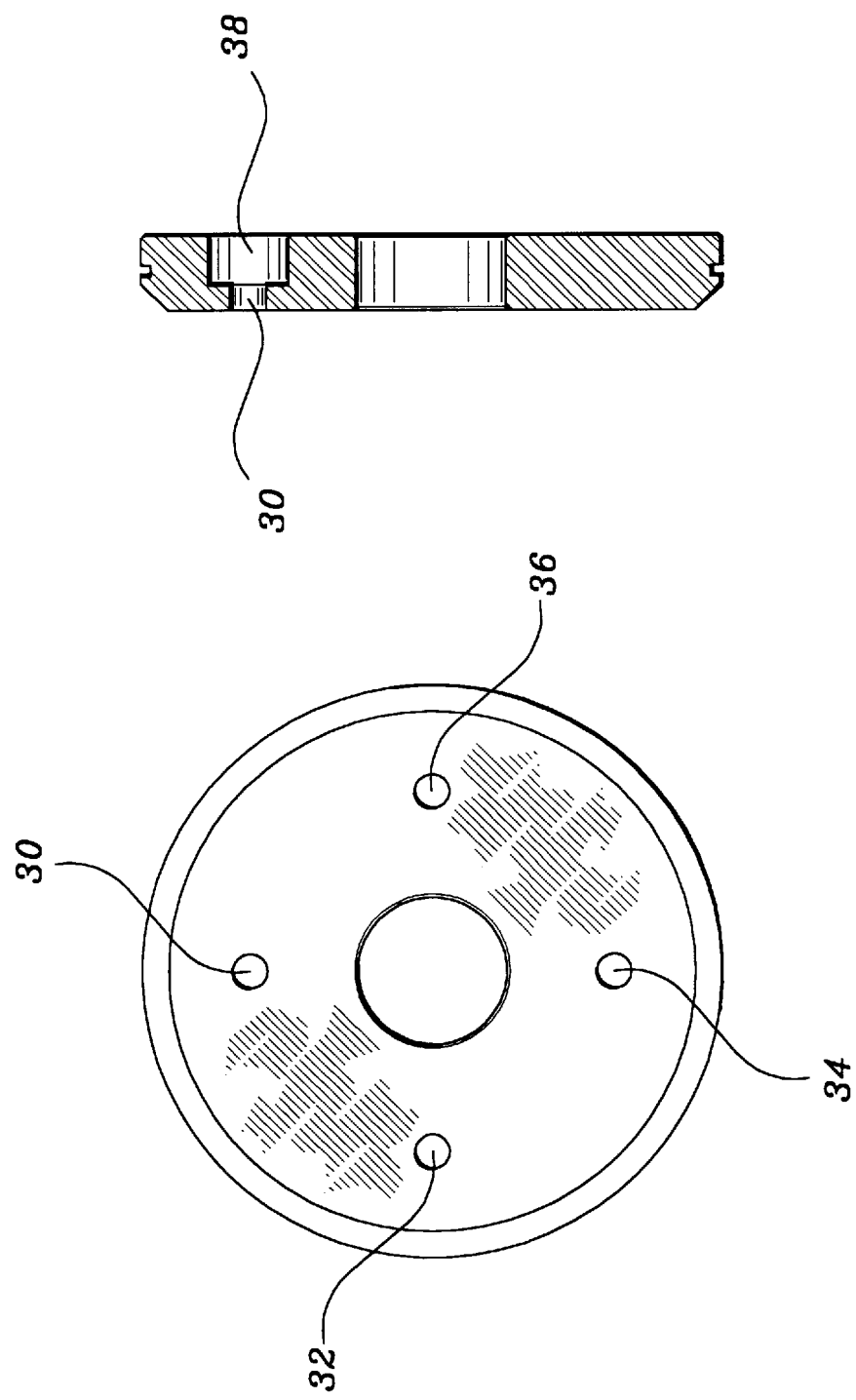

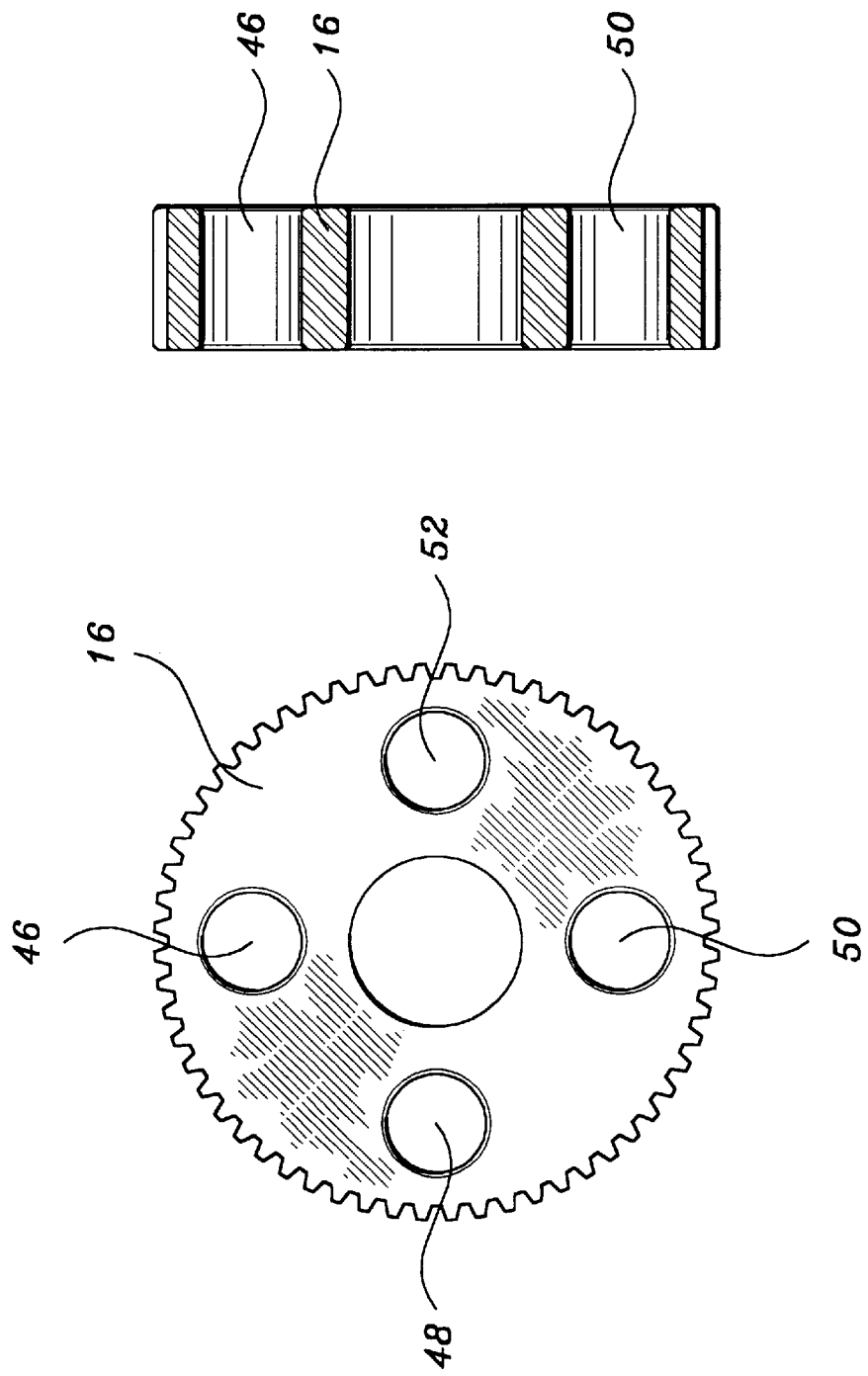

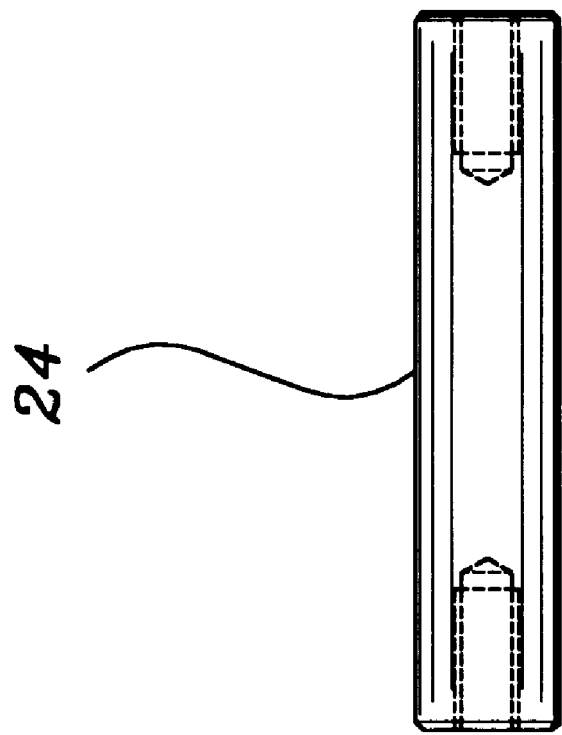
Figure 5b
Figure 5a

PLANOCENTRIC HYPOCYCLOIDAL GEAR

BACKGROUND OF THE INVENTION

1. Field of the Invention

This invention relates to a gear assembly and, more specifically, to a planocentric hypocycloidal gear assembly designed to receive an input horsepower of between one-third and five horsepower.

2. Related Art

Planocentric hypocycloidal gear assemblies are used for speed reduction and have typically been utilized in association with large machinery. These gear assemblies generally comprise an input shaft cover plate, an eccentric input shaft, an input shaft bearing placed on the eccentric input shaft and within a hole in the input shaft cover plate, a first pinion having drive holes and a first bearing hole, a first pinion bearing fitted inside the first pinion bearing hole, a second pinion having drive holes and a second bearing hole, a second pinion bearing fitted inside the second pinion bearing hole, an eccentric input shaft bearing, drive pins, secured to an output shaft plate which itself is secured to an output shaft, an output shaft bearing disposed on the output shaft, an output shaft cover plate, and a housing surrounding the entire assembly. The drive pins are equipped with sleeves to alternately adjust the total diameter presented to the drive holes. Specifically, the sleeve is placed over portions contacting the drive holes and the first and second pinions. However, the sleeve does not extend into the drive hole in the output shaft cover plate.

In operation, the eccentric input shaft is coupled to a driving motor. The driving motor drives or rotates the eccentric input shaft. As the eccentric input shaft rotates, the eccentricity of the shaft drives the first and second pinions in a camming action. The rotation of the shaft and pinions is assisted by the various bearings. As the pinions are driven in a planocentric hypocycloidal path as defined by the eccentricity of the eccentric input shaft, the sleeves of the drive pins extending through the drive holes of the pinions are in turn driven which rotates output cover plate and output shaft. It is specifically noted that the drive pins do not come into direct contact with the pinion surface, that being reserved for the drive pin sleeves.

Due to the construction of these planocentric hypocycloidal gear assemblies, the number of parts required has discouraged the application of this technology to small machinery. While small scale models without the drive pin sleeves of these larger planocentric hypocycloidal gear assemblies have been utilized for demonstrations purposes, namely, to demonstrate the planocentric hypocycloidal path, these models can not be seriously considered "working" models in any capacity. Moreover, the small demonstration models will not support an input application of between one-third and five horsepower. Accordingly, there has been no attempt to modify these larger planocentric hypocycloidal gear assemblies for small machinery involving an input application of between one-third and five horsepower.

As a result, there is a need in the art to modify the planocentric hypocycloidal gear assembly and to reduce the number of parts and associated costs in order to adapt this technology for lower input horsepower applications.

SUMMARY OF THE INVENTION

It is in view of the above problems that the present invention was developed. The invention is a planocentric hypocycloidal gear assembly which eliminates drive pin sleeves, a separate exterior housing, and all bearings, and provides for drive pins which drive the pinions directly and provides for an aperture in an output cover plate for direct contact with an eccentric input shaft designed for inputs of between one-third and five horsepower.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIGS. 2a, 2b, 2c, and 2d illustrate an input shaft cover plate of the present invention from a top plan view, sectional view taken along line A—A of FIG. 2c, bottom plan view, and detail view from an area labeled "B" in FIG. 2b, respectively;

FIGS. 3a and 3b illustrate the top view and cross sectional view, respectively, of a pinion gear of the present invention;

FIGS. 5a and 5b illustrate the side elevational and top plan views, respectively, of a drive pin of the present invention.

DETAILED DESCRIPTION OF THE PREFERRED EMBODIMENTS

Figure 1:
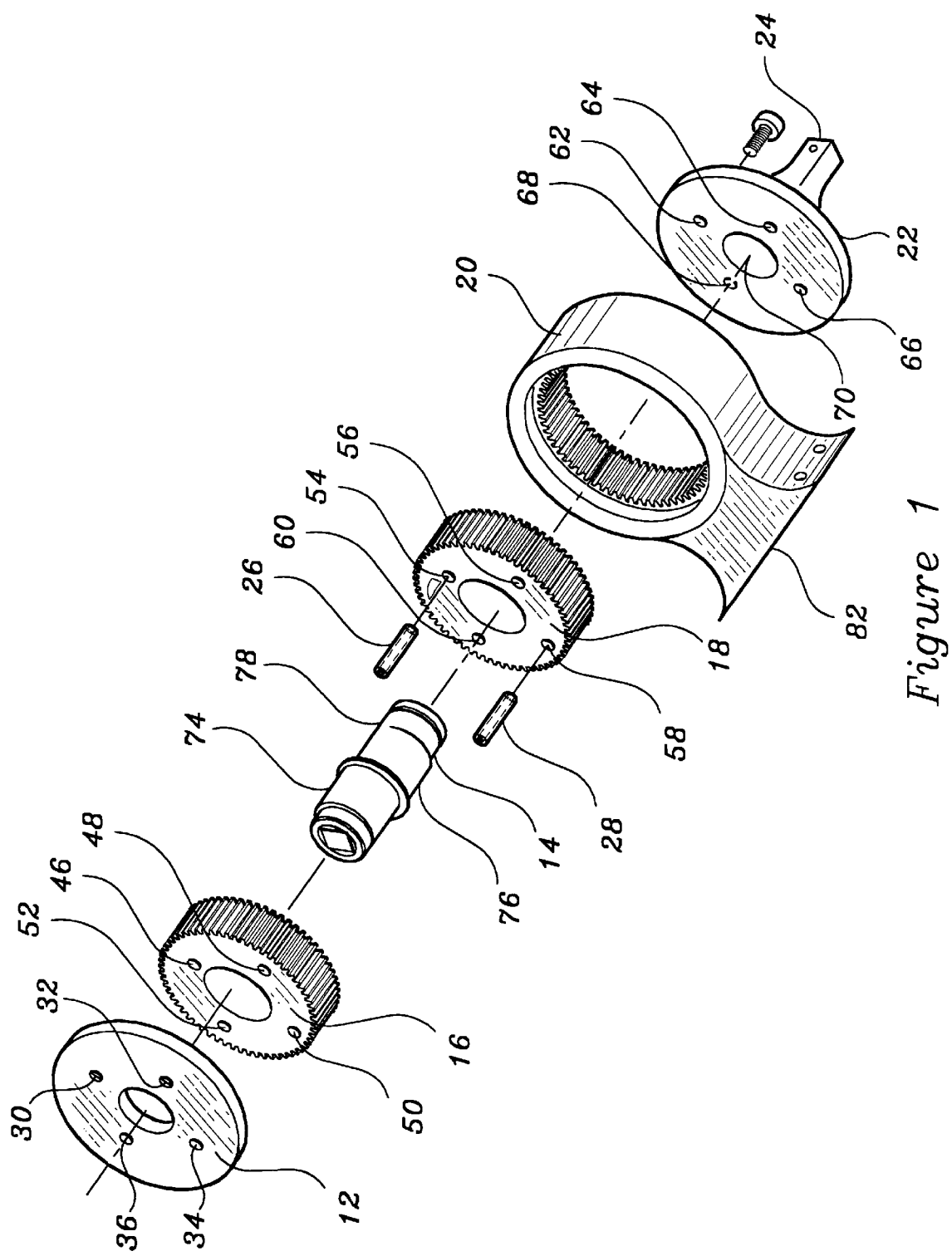
FIG. 1 illustrates an exploded view of one embodiment of a planocentric hypocycloidal gear of the present invention.
Figure 2D:
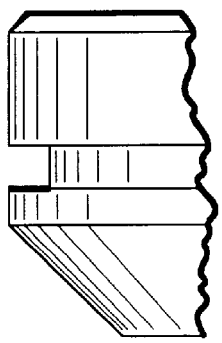
Figure 2C:
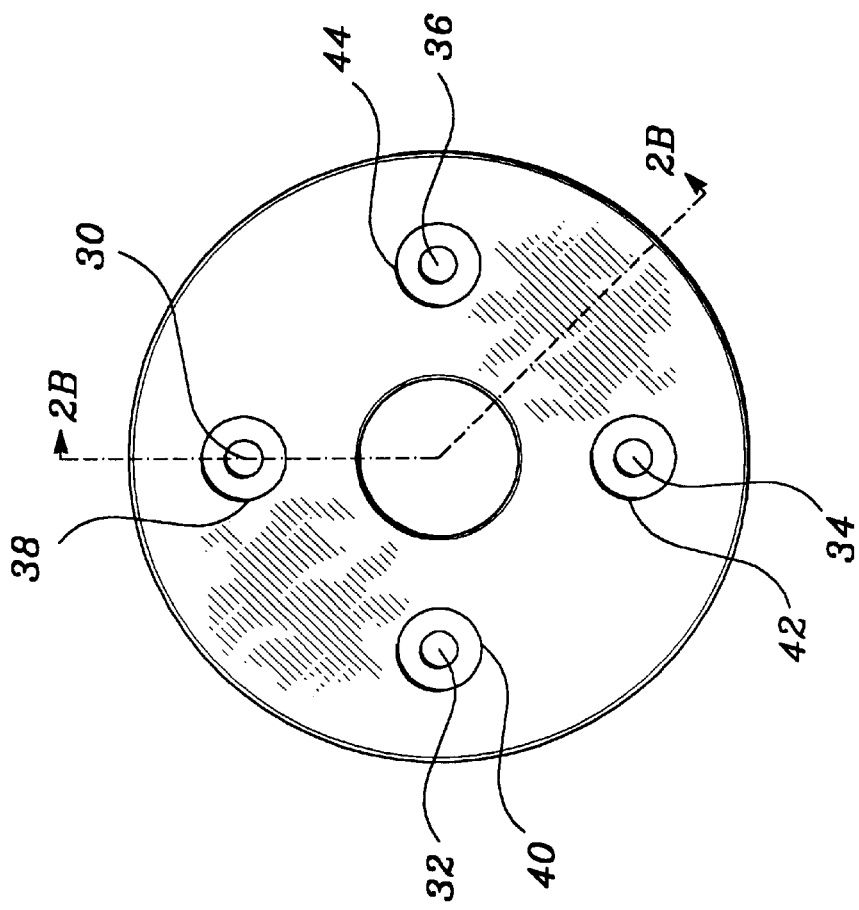
Figure 4E:
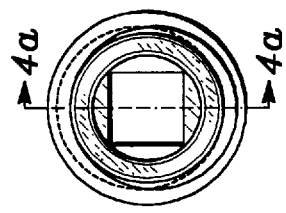
FIGS. 4a, 4b, 4c, 4d, and 4e illustrate an eccentric input shaft in a longitudinal cross-section view, a detail view of an area indicated at "C" in FIG. 4a, a front plan view, a detail view of an area indicated at "B" in FIG. 4a, and a rear plan view, respectively.
Figure 4A:
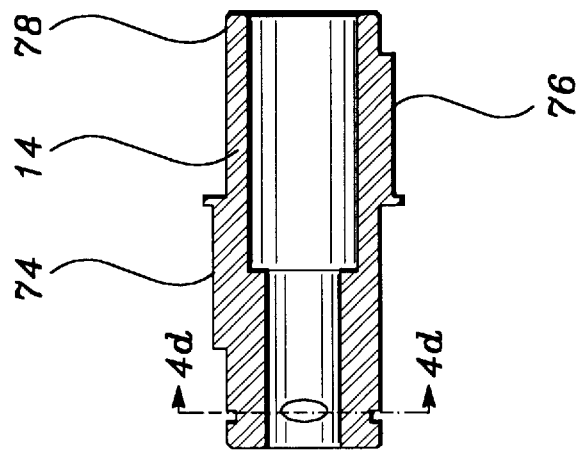
Figure 4B:
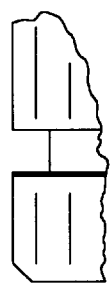
Figure 4C:
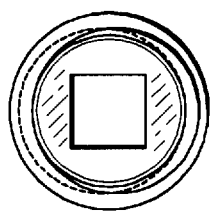
Figure 4D:
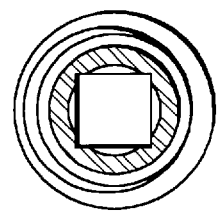
Figures 6A, 6B:
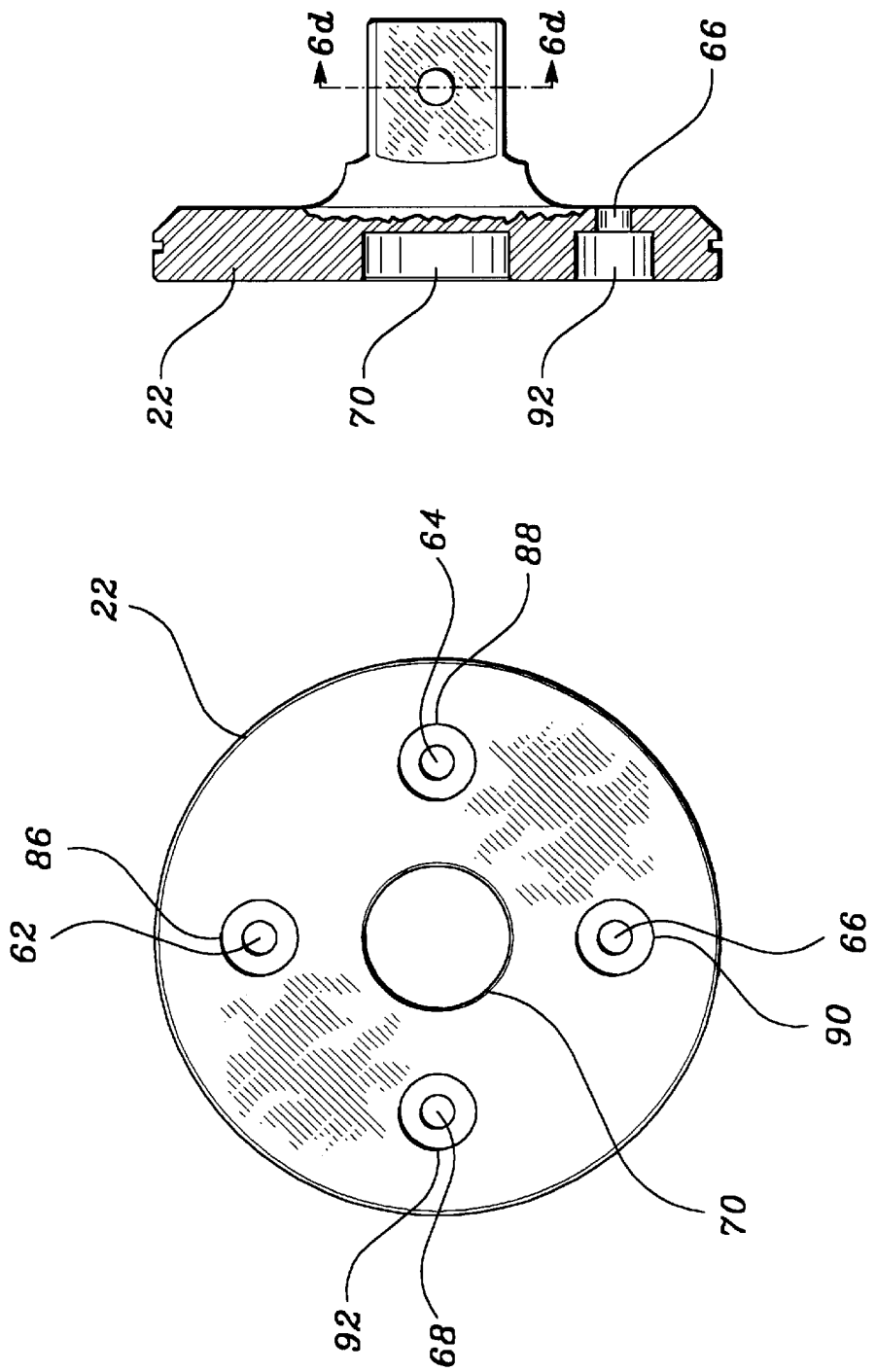
FIGS. 6a, 6b, 6c, 6d, 6e, and 6f illustrate the top plan view, sectional view, bottom plan view, section view along line C—C, detail of area labeled "D" from FIG. 6b, and view along line B—B from FIG. 6c, respectively, of an output shaft cover plate and output shaft of the present invention.
Figure 6D:
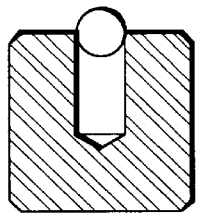
Figure 6E:
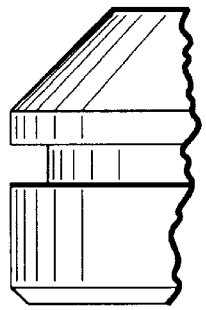
Figure 6F:
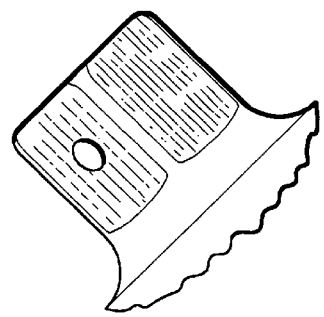
Figure 6C:
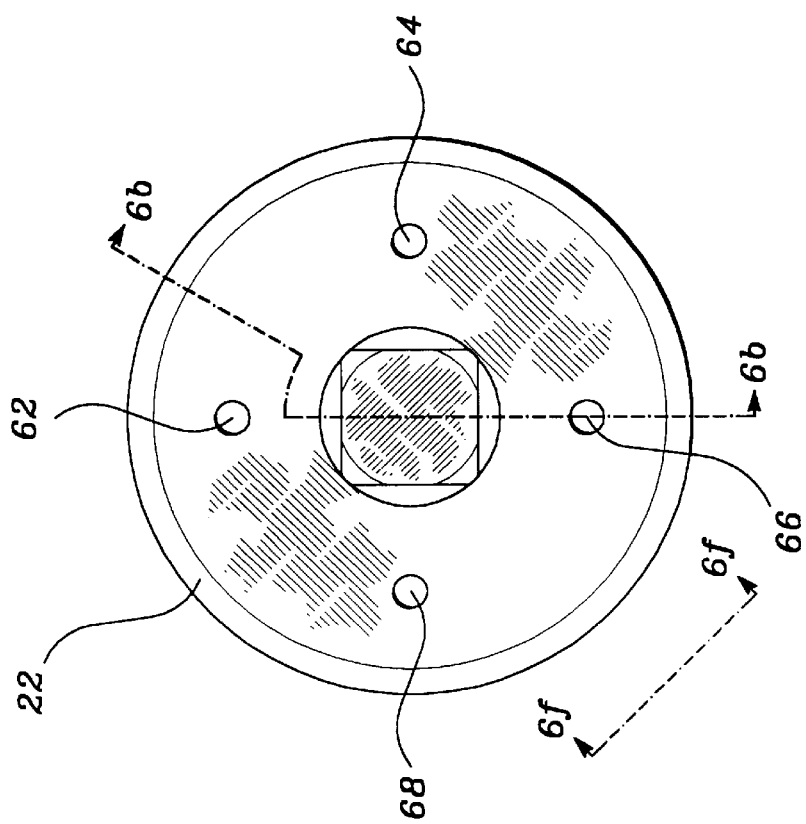

Referring to the accompanying drawings in which like reference numbers indicate like elements, FIG. 1 illustrates an exploded view of the planocentric hypocycloidal gear assembly, shown generally at 10, of the present invention. Planocentric hypocycloidal gear assembly 10 comprises input cover plate 12, eccentric input shaft 14, first pinion gear 16, second pinion gear 18, ring gear 20, output shaft cover plate 22, output shaft 24, and drive pins 26 and 28.

As illustrated in FIGS. 1, 2a, 2b, 2c, and 2d, input cover plate 12 may be provided with mounting means such as apertures 30, 32, 34, and 36 for receiving a fastener such as a bolt, pin, rivet, or screw for face mounting planocentric hypocycloidal gear assembly 10 on a surface such as a table top. Alternately, input cover plate 12 may be clamped, hooked, or welded to a surface.

Aperture 30 may be configured so that a bolt head (not shown) may be inserted flush with the plane defined by one side of input cover plate 12. But as shown in FIG. 2b, the aperture may also be configured so that the bolt head is not flush with such plane in favor of providing additional apertures 38–44 for placing tapped drive pins 26 and 28. Clearly, if drive pins 26 and 28 are tapped and inserted into input cover plate 12 for securement by bolting, input cover plate 12 may not be directly mounted to a non-moving surface, and mounting must be accomplished by other means.

As illustrated in FIGS. 1, 3a, and 3b, first pinion gear 16 is provided with four drive pin holes 46–52. Similarly, second pinion gear 18 is provided with drive pin holes 54–60. Output shaft cover plate 22 is provided with apertures 62–68 for receiving drive pins 26 and 28.

First pinion gear 16 and second pinion gear 18 as shown are both spur-type gears and are equipped with involute gear teeth formed at a thirty degree pressure angle. It has been this inventor's experience that a pinion gear having sixty teeth and a ring gear having sixty-two teeth may be employed to achieve a 30:1 gear ratio.

Eccentric input shaft 14 is shown in greater detail in FIGS. 4a, 4b, 4c, 4d, and 4e. Eccentric input shaft 14 has a first end 74, a middle portion 76, and a second end 78. First pinion gear 16 is disposed on first end 74 of eccentric input shaft and second pinion 18 is disposed on middle portion 76 of eccentric input shaft. As illustrated in FIG. 4, first pinion gear and second pinion gear are spaced slightly to prevent physical contact. A spacing of up to 0.2 inches is desirable, with less spacing between first and second pinion gears 16 and 18 to decrease material costs, both in eccentric input shaft 14 and the width of ring gear 20. The inventor has discovered that a spacing of 0.062 inches is preferred.

Although only two drive pins 26 and 28 are shown in FIG. 1 for convenience, four drive pins are contemplated to match the number of drive pin holes illustrated. A single drive pin 26 will still permit planocentric hypocycloidal gear assembly 10 to function, but the motion will not be continuous. Accordingly, two drive pins 26 and 28 are the minimum number required to achieve continuous motion of planocentric hypocycloidal gear assembly 10. As shown in FIGS. 5a and 5b, drive pin 26 may be tapped on both sides for receiving a bolt.

Ring gear 20 is disposed around first pinion gear 16 and second pinion gear 18, and engages first pinion gear 16 and second pinion gear 18. As shown in FIG. 1, ring gear 20 may also be equipped with mounting means such as a flange base 82 in combination with a bolt, screw, pin, rivet, clamp, or hook, which mounting means permits ring gear 20 to be mounted on a fixed surface. However, other mounting means such as welding ring gear 20 directly to a fixed surface may be utilized.

With respect to materials, eccentric input shaft 14, first and second pinions 16 and 18, drive pins 26 and 28, and output shaft 24 may be made from any high tensile gear steel such as 52100, 4140, 4340, Maxell 2B, Maxell 3B, or the like. Powder metal for first and second pinions 16 and 18 may also be used, but must then be heat-treated. Clearly, the aforementioned parts may also be hardened by heat treatment or induction, or pre-hardened, with a view towards achieving a hardness rating of 28–32 Rockwell C or higher. Ring gear 20 is cut internally from an 1144 or 1148 forging to form the teeth.

Output cover plate 22 may be provided with mounting means such as apertures 62–68 for receiving a fastener such as a bolt, pin, rivet, or screw for face mounting planocentric hypocycloidal gear assembly 10 on a surface such as a table top. Alternatively, output cover plate 22 may be clamped, hooked, or welded to a surface. As shown in greater detail in FIGS. 6a, 6b, 6c, 6d, 6e, and 6f, output cover plate 22 is provided with an aperture 70 which receives and seats second end 78 of eccentric input shaft 14.

Output cover plate 22 is also provided with drive pin holes 86–92. As stated earlier, drive pins 26 and 28 extend from input cover plate 12 through first pinion gear 16, second pinion gear 18, and into output cover plate 22. Because output cover plate is fixed in relation to output shaft 24, output cover plate may not be used for face mounting planocentric hypocycloidal gear assembly 10. Thus, drive pins 26 and 28 need only be tapped from one side.

In operation as between one-third and five horse power is applied rotationally to eccentric input shaft 14, which is itself rotated, the camming action of first end 74 and middle portion 76 of eccentric input shaft 14 drives first pinion gear 16 and second pinion gear 18 one hundred and eighty degrees out of phase, respectively, around the interior of ring gear 20, defining a planocentric hypocycloidal motion. Drive pin holes 46–60 rotate with their respective pinion gears 16 and 18, thereby engaging and rotating drive pins 26 and 28. Because drive pins 26 and 28 are rotating, output cover plate 22 is driven rotationally, thereby rotating connected output shaft 24. It should be noted that drives pins 26 and 28 are also driving input cover plate 12 (which is not fixed in relation to eccentric input shaft 14), unless planocentric hypocycloidal gear assembly 10 is face mounted at input cover plate 12.

By employing this combination, the use of drive pin sleeves, all bearings, and a separate exterior housing are eliminated over the prior art. The savings in the number of parts employed over the prior art are achieved through the use of tighter spacing between first and second pinions 16 and 18, the use of an aperture 70 in output cover plate 22, and direct drive of the pinions, input cover plate 12, and output cover plate 22 by the drive pins 26 and 28.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, if three pinions are used instead of two, the eccentric input shaft would be formed to produce a camming action driving the three pinions out of phase by one hundred and twenty degrees, relatively. If four pinions are used, they may be driven out of phase by ninety degrees, relatively. In addition, while mounting planocentric hypocycloidal gear assembly 10 on a fixed surface is clearly contemplated, planocentric hypocycloidal gear assembly 10 need not be so mounted. Thus, the breadth and scope of the present invention should not be limited by any of the above-described exemplary embodiments, but should be defined only in accordance with the following claims appended hereto and their equivalents.

What is claimed is:

1. A planocentric hypocycloidal gear assembly comprising:
   an input cover plate;
   an eccentric input shaft formed from a single member having a first end, a middle portion, and a second end, for receiving a radial load;
   a first pinion gear having a first drive pin hole and being disposed on said first end of said eccentric input shaft;
   a second pinion gear having a second drive pin hole and being disposed on said middle portion of said eccentric input shaft and spaced from said first pinion gear;

a ring gear disposed around said first pinion gear and said second pinion gear, and engaging said first pinion gear and said second pinion gear;

an output plate having a third drive pin hole and an aperture for receiving said second end of said eccentric input shaft;

a drive pin extending through said first drive pin hole of said first pinion, said second drive pin hole of said second pinion, and said third drive pin hole of said output plate, so that said drive pin drives said first and second pinions and said output plate through direct contact, upon rotation of said eccentric input shaft;

an output shaft secured to said output plate; and wherein said eccentric input shaft is provided with power of between one-third and five horsepower at said first end.

2. The planocentric hypocycloidal gear assembly according to claim 1, wherein said first and second pinion gears have involute gear teeth with a thirty degree pressure angle.

3. The planocentric hypocycloidal gear assembly according to claim 1, wherein said ring gear has mounting means for mounting said planocentric hypocycloidal gear assembly on a surface.

4. The planocentric hypocycloidal gear assembly according to claim 1, wherein said first and second pin holes each have diameters larger than the diameter of said drive pin.

5. The planocentric hypocycloidal gear assembly according to claim 1, wherein said drive pin has an aperture for receiving a fastener.

6. The planocentric hypocycloidal gear assembly according to claim 5, wherein said aperture is threaded and said fastener is a bolt.

7. The planocentric hypocycloidal gear assembly according to claim 1, wherein said input cover plate has an aperture for receiving a fastener for mounting on a surface.

* * * * *